Feb. 2, 1932. G. E. SMITH ET AL 1,843,904
METHOD OF MAKING MOLDED WHEELS
Original Filed Jan. 21, 1926  3 Sheets-Sheet 1
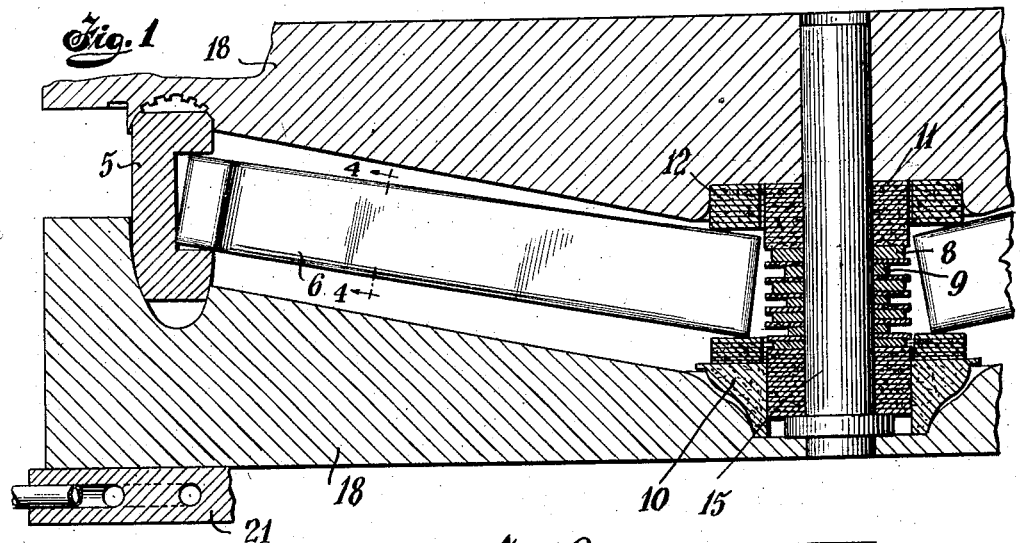
Inventors
Grant E. Smith
Henry S. Morgan.
By their Attorneys Feb. 2, 1932. G. E. SMITH ET AL 1,843,904
METHOD OF MAKING MOLDED WHEELS
Original Filed Jan. 21, 1926    3 Sheets-Sheet 2
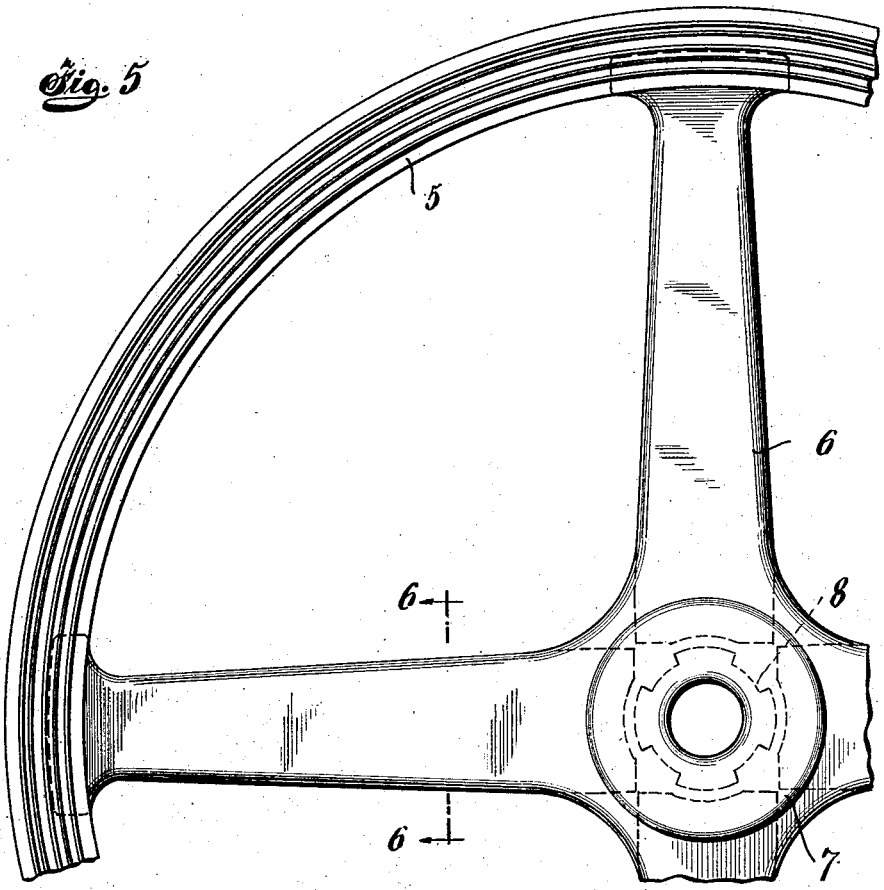
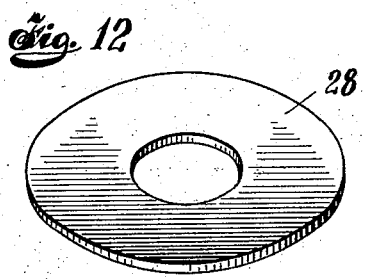
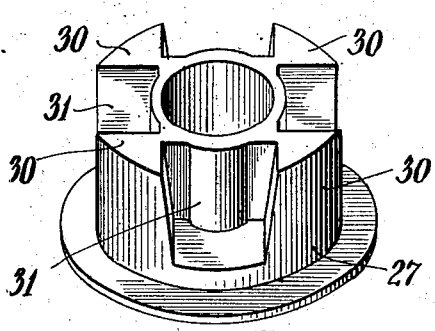
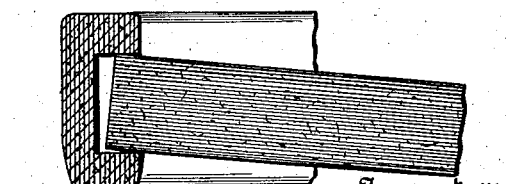
Inventors
Grant E. Smith.
Henry S. Morgan.
By their Attorneys Feb. 2, 1932. G. E. SMITH ET AL 1,843,904
METHOD OF MAKING MOLDED WHEELS
Original Filed Jan. 21, 1926   3 Sheets-Sheet 3
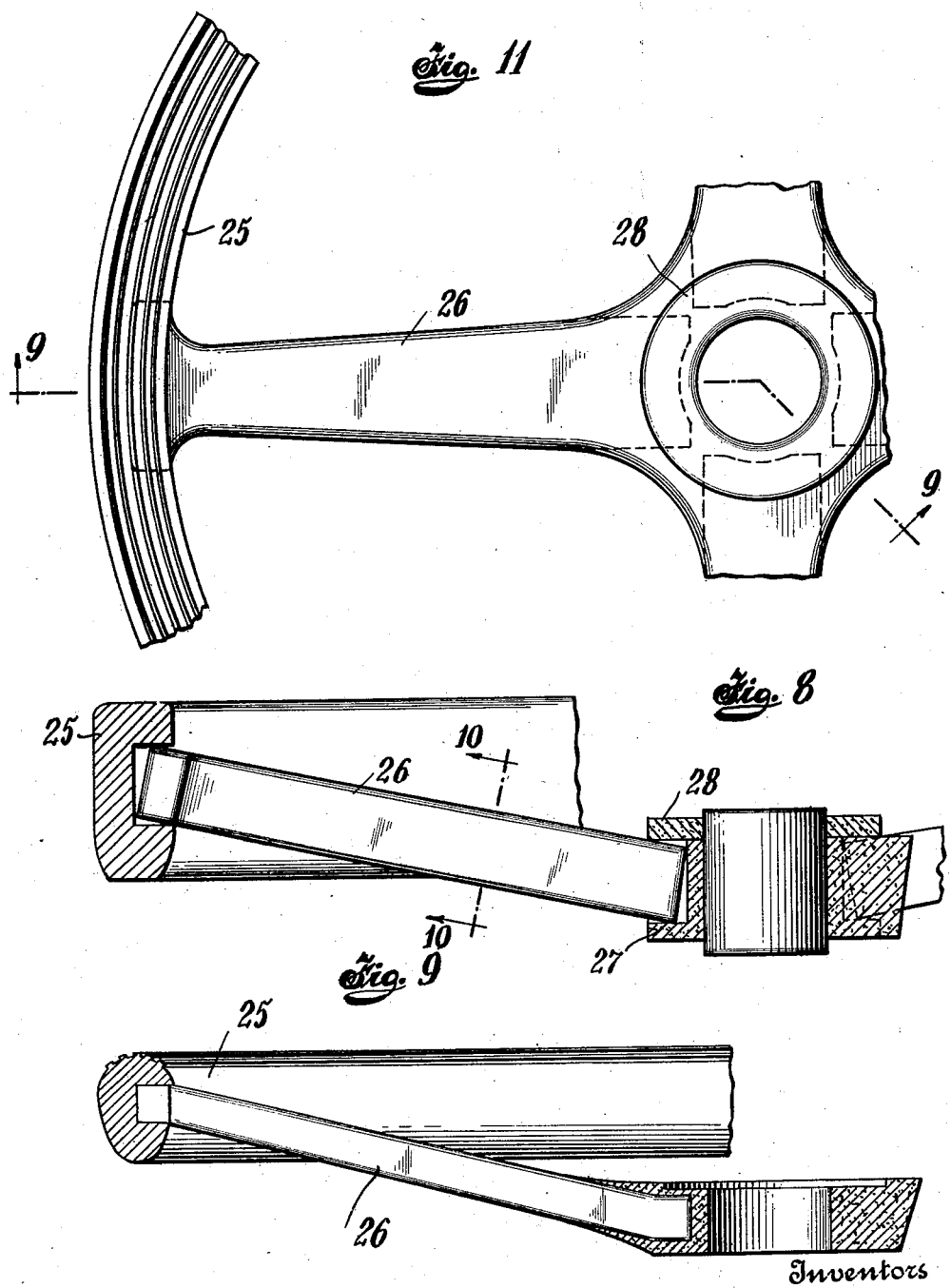

Patented Feb. 2, 1932

1,843,904

UNITED STATES PATENT OFFICE

GRANT E. SMITH AND HENRY S. MORGAN, OF POUGHKEEPSIE, NEW YORK, ASSIGNORS TO POUVAILSMITH CORPORATION, OF POUGHKEEPSIE, NEW YORK, A CORPORATION OF NEW YORK

METHOD OF MAKING MOLDED WHEELS

Application filed January 21, 1926, Serial No. 82,663. Renewed March 2, 1928.

The present invention relates to molded wheels of wood or other suitable moldable material and to the manufacture thereof, the principal object being to provide a strong, durable wheel made of moldable material and to provide an economical and expeditious method of manufacturing the same. Inasmuch as the invention has been developed in connection with the manufacture of steering wheels for automobiles such an embodiment of the invention has been selected for illustration and description herein.

The manufacture of wooden steering wheels by the methods more commonly employed involves considerable expense and requires skilled labor in the forming of the wheel and in the finishing thereof to afford the desired surface.

The present invention provides a method of manufacture whereby a wheel may be made of inexpensive materials including fibrous materials such as paper, chipboard and the like with or without parts cut out of wood, the material being so treated during the process of manufacture that the desired strength is obtained without making any part of the wheel of undue size. The method can be operated economically and expeditiously by relatively unskilled labor, and relatively inexpensive raw materials can be used effectively. Wheels made in accordance with the invention will not appreciably warp or shrink and are hard, durable, weatherproof and of attractive appearance.

The nature and objects of the invention will be better understood from a description of an illustrative embodiment thereof for the purpose of which description reference is made to the accompanying drawings forming a part hereof wherein:

Figure 1 is a central sectional view showing the blank parts from which the steering wheel is to be made, assembled in a mold and ready to be compressed and molded to form the wheel;

Figure 2 is a similar view showing the wheel in molded condition in the mold;

Figure 3 is a detail perspective view showing the shape and arrangement of the central hub members including the metal reenforcing rings and interposed fibrous material;

Figure 4 is a cross-sectional view showing the shape of a spoke blank taken on the line 4—4 of Figure 1;

Figure 5 is a plan view of the finished wheel shown in Figure 2;

Figure 6 is a cross-sectional view taken on the line 6—6 of Figure 5 showing the shape of a finished spoke;

Figure 7 is a central cross-sectional view of a finished wheel showing a slightly different construction in which the annular reenforcing metal members are of such shape as not to be bent during the molding operation;

Figure 8 is a central sectional view of blank members assembled ready to be compressed to form a wheel having a relatively thin hub structure adapted to be connected to a steering post by metal clamping members;

Figure 9 is a similar view showing the finished wheel;

Figure 10 is a sectional view taken on the line 10—10 of Figure 8 showing the shape of the spoke blank;

Figure 11 is a plan view of the wheel shown in Figure 9;

Figure 12 is a detail perspective view showing the hub blank sections of Figure 8;

Figure 13 is a sectional view showing a spoke blank and rim blank made of laminæ of chipboard or the like;

The steering wheel shown in Figure 2 comprises a rim 5, spokes 6 and a hub 7 molded about and securing together the inner ends of the spokes. The hub is preferably reenforced by suitable metal rings 8, 9 molded into and forming a part of the hub and serving in effect as a metal bushing. As best shown in Figure 3 the alternate rings 8 are of larger diameter than the rings 9 and are also formed with lugs on their outer edges and with holes therein to permit an interlocking with the hub structure. The outer edges of the smaller rings are roughened as by milling.

The preferred method of making this wheel involves forming the necessary blank sections from chipboard, wood or other suitable moldable material, suitably treating the sections, assembling them together with any desired metal reenforcement, heating and molding the whole under sufficient pressure to compress the material and form the finished wheel. Such parts of the blank as are made of wood may be of any suitable wood, such as maple, birch, ash or gum.

The preliminary treatment of the blank parts to form the same and to prepare them for the molding operation may vary considerably. There are some advantages in making the rim and spokes of wood and this material is indicated in the structure shown in Figure 2. The rim sections may be formed from straight pieces of wood by steaming and bending, the separate pieces being assembled to form a complete rim. The spokes may be separate pieces the outer ends of which are inserted in suitable recesses in the rim and the inner ends of which are received within the hub structure. The hub structure, as best indicated in Figure 1 may be made up of fibrous material in which are introduced metal reenforcing rings 8, 9. The lowermost section 10 of the hub of this particular wheel is preferably formed as a separate member molded of suitable fibrous material such as mascerated chipboard for the reason that by so preparing a separate piece it may be made to fit the shape of the mold more satisfactorily. The remaining parts may be arranged in any suitable way.

As shown the central portion of the hub structure is built up of a number of rings 11 of cardboard between certain of which the metal rings 8, 9 are interposed. Around the upper portion of the central hub structure are placed a number of larger rings 12 of chipboard to form the upper and outer part of the hub.

The several parts of the blank are suitably treated with a suitable condensation product which acts as an adhesive binder in the finished wheel. For example, any suitable phenolic condensation product may be used. Such parts of the blank as are formed of a relatively thick mass of material such as the section 10 of the hub structure have the binder incorporated therein and distributed throughout the body thereof. Such parts as are made of chipboard sheets may be either saturated with or coated on both sides with the binder or adhesive. The parts are preferably dried after coating and before molding and the several laminae may be either loosely arranged or, if preferred for convenience in handling, they may be cemented together by the binder to form unitary structures before being assembled to form the complete blank.

The wood sections may be more or less impregnated with the binder, which also serves to afford a surface finish for the completed article or they may simply be superficially coated therewith and dried. As indicated in Figure 1 the several elements of the hub structure are assembled upon a central pin 15 which fits into the mold and serves as a part thereof during the molding operation to determine the shape and size of the central hub opening. The pin 15 may be formed with a projecting key in order to form a keyway in the hub structure, the hub parts being correspondingly recessed to fit thereover or if preferred the pin may be round and the keyway afterward cut in the hub of the finished wheel.

The complete assembled blank is compressed and molded in the mold 18 between suitably heated upper and lower heads 20, 21 to form the finished wheel. The compressing and molding operation will cause the material of the hub structure to flow around and closely embrace the inner ends of the spokes and securely hold the same. Ordinarily it is unnecessary to provide separate filler members between the spokes circumferentially around the central hub members but this may be done if desired. During the molding operation the outer edges of some of the reenforcing rings especially the larger rings 8 will be bent towards the central plane of the hub as indicated in Figure 2. This provides an interlocking of the metal reenforcement or bushing parts with the fibrous material of the hub structure in a manner which for some purposes is particularly desirable.

The hub structure indicated in Figure 7 may be obtained by using rings 22 all of which are of substantially the same size and if desired fewer rings may be used and they may be placed further apart. The fibrous material is also arranged with a view to avoiding any tendency to bend the rings in this structure. The structure is otherwise substantially the same as that shown in Figure 2.

The wheel shown in Figures 8 to 11 inclusive is in general the same construction as that shown in Figure 2 but is designed to be secured to the steering post by means of a clamping arrangement having upper and lower plates to which the wheel is secured by bolts passing vertically through the hub thereof. No keyway is required in the hub of this wheel and the hub may be made relatively thin and without metal reenforcement. The method of assembling is substantially the same as that previously described with reference to the wheel shown in Figure 2. The blank may comprise rim and spoke sections 25, 26 with a lower hub section 27 molded of fibrous material and a binder and an upper annular hub section 28 of similar material. The hub section 27 is shown as formed with projections 30 in the recess 31 between which, the spoke sections 26 are received.

In Figure 13 the spoke and rim blank sections are shown as built up of laminated material. In the construction of the spoke sections sheets of chipboard suitably coated with the binder are superposed and preferably secured together by the binder. The material thus produced may be machined more or less in the same manner as wood can be machined to form the desired blank sections. The rim blanks are similarly formed of superposed chipboard strips but they are not secured together by the binder until after the assembled strips are bent to arcuate form.

When molding the assembled blank to form the finished wheel the assembled blank is placed in the preferably previously heated mold and the mold is placed in a press between the heated pressure heads 20, 21. After the blank has been arranged in the mold additional adhesive, preferably in the form of dry powder, may be added at the joints and more particularly around the hub to fill all crevices and to insure a stronger and better joint. The pressure heads of the press are then brought against the mold parts to press the same against the blank with a light pressure. The blank is allowed to absorb heat from the mold and the mold to absorb more heat from the pressure heads for a predetermined time, for example five minutes, until the blank becomes heated, after which the extreme pressure is applied to close the mold and compress the blank to form the finished wheel. The heat and pressure is maintained for a sufficient time to insure curing of the adhesive after which the mold is cooled while still maintaining the pressure, or sufficient pressure to prevent expansion of the blank. During the compressing and molding operation the wood and fibrous material will flow to conform to the shape of the mold, that is to say, the fibres of the wood will move relatively and adjust themselves to the configuration of the mold in which the blank is compressed.

The heat of the mold first softens and makes plastic the adhesive and then during the compressing operation the adhesive is forced into the pores of the wood along the surface thereof and is caused to co-act with and bind together the fibres of the wood and other fibrous material used and simultaneously the adhesive at the surface of the blank is cured to form a hard, wear-resisting surface. The adhesive also acts as a lubricant between the mold and the blank.

The pressure employed may range for example from 500 to 5000 pounds per square inch of the blank to be compressed, depending upon the amount of compression desired, the material compressed, the size of the desired resultant article, and other peculiar features, characteristic of the material, finish or mold. The temperature at which the operation is performed may vary considerably. Successful results have been obtained by compressing at temperatures which approach 300° F. It is convenient to heat the pressure heads by steam under a pressure of about 85 pounds per square inch circulating in suitable passages 30 therein. The mold may be cooled when the pressing operation is finished by circulating water in these same passages. The preliminary heating of the molds prior to inserting the blank may be accomplished in any suitable way, we find it convenient to provide steam tables heated by steam under a pressure of 85 pounds per square inch on which the molds are heated before the blank is inserted. If preferred the mold may be provided with passages therein to remove the heating steam and cooling water directly.

The invention provides an exceptionally strong structure and a method whereby the same may be manufactured expeditiously and economically by relatively unskilled operatives. The operation of compressing the wood or other moldable material and curing the condensation product or other equivalent binder produces a wheel which will not appreciably warp or shrink. The wood, if wood is used for a part of the blank is preferably compressed to approximately one-half of its original volume and the fibrous material may be advantageously compressed to an even greater extent especially if the material used is not dense in its original condition.

The foregoing description is illustrative merely and is not intended as defining the limits of the invention.

We claim:

1. The method of making a molded spoked wheel spider including spoke and hub portions, which comprises, assembling moldable spoke blanks with moldable material about their inner ends and molding the material and the inner ends of the spoke blanks to secure the spoke blanks together and form a hub.

2. The method of making a molded spoked wheel of material which in the final product is considerably reduced from its initial volume, which comprises, pre-molding portions of the wheel wherein the bulk of the original material used renders it desirable, to reduce the volume of the material and make the portions conform more closely to the shape of the final mold, and thereafter further molding the material under heat and pressure to form the final wheel.

3. The method of making a molded spoked wheel including a hub and spokes which comprises, assembling an inner stack of moldable material and outer concentric rings about the inner ends of the spokes and molding the assembly under pressure to form an integral hub and spoke structure.

In testimony whereof, we have signed our names to this specification this 15th day of January, 1926.

GRANT E. SMITH.
HENRY S. MORGAN.